United States Statutory Invention Registration [19]

[11] Reg. Number: H430

Carignan et al. [43] Published: Feb. 2, 1988

[54] AZIDODEOXYCELLULOSE NITRATE

[75] Inventors: Yvon P. Carignan, Somerville; Everett E. Gilbert, Morristown, both of N.J.

[73] Assignee: The United States of America as represented by the Secretary of the Army, Washington, D.C.

[21] Appl. No.: 24,091

[22] Filed: Mar. 2, 1987

[51] Int. Cl.[4] ..... C08B 1/04

[52] U.S. Cl. ..... 536/37; 536/38; 149/19.8

*Primary Examiner*—Edward A. Miller

*Attorney, Agent, or Firm*—Anthony T. Lane; Harold H. Card, Jr.; Edward F. Costigan

[57] ABSTRACT

A process of making azidodeoxycellulose nitrate in yields as high as 90 percent. The process initially involves the conversion of cellulose to the mesylate or tosylate derivative. This is followed by reacting the above cellulose derivative with a metallic azide to produce azidodeoxycellulose. Thereafter, the azidodeoxycellulose is nitrated thereby producing azidodeoxycellulose nitrate which is a propellant.

5 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AZIDODEOXYCELLULOSE NITRATE

FIELD OF USE

This invention relates to an improved process of making azidodeoxycellulose nitrate, a propellant, in high yields.

BACKGROUND

In the art, the method of preparing azidodeoxycellulose nitrate involves the reaction of nitrocellulose with a metallic azide. However, the yields obtained in the past were only 25 to 50 percent of that theoretically possible.

SUMMARY OF INVENTION

It is therefore an object of this invention to provide a process of making azidodeoxycellulose nitrates in yields as high as 90 percent of theory.

The process of the present invention initially involves the conversion of cellulose to cellulose mesylate or tosylate. This is followed, in the second stage, by reacting cellulose mesylate or cellulose tosylate with a metallic azide to give azidodeoxycellulose. And, in the final stage, nitrating the latter azide derivative to give azidodeoxycellulose nitrate, the propellant product in high yield.

PREFERRED EMBODIMENT

The following are examples of the various stages in the process of preparing azidodeoxycellulose nitrate in high yield. The starting materials, i.e., the mesylate and tosylate of cellulose were prepared in accordance with the procedure of Roberts, J. Am. Chem. Soc. 79,1175, (1957).

EXAMPLE 1

30.0 g of cellulose mesylate was mixed with 30.0 g of sodium azide in 500 ml of dimethylformamide, and heated for about 71 hrs. at 90° C. The solution was then cooled, and poured into water to precipitate the azidodeoxycellulose product which was filtered out of the solution and dried. The product yield was 22.0 g which is 94 percent of the theoretical yield. The product was identified as the desired azide by the characteristic infrared peak at 2100 $cm^{-1}$. In analysis for nitrogen, the percent found was 18.5 percent and the amount calculated for the monoazide was theoretically 22.5 percent.

EXAMPLE 2

3.0 g of the azidodeoxycellulose, produced in accordance with Example 1, was ground in an attrition mill, and added in three portions at room temperature to a stirred mixture of 120 ml of nitric acid (99%) and 90 ml of dichloromethane. The mixture was then stirred for 30 minutes forming a solution. At this point, the latter solution was added dropwise over a ten minute period to 360 ml of water with vigorous stirring. The addition of the solution to the water was carried out under a conventional hood but without cooling. The temperature of the water soon rose to 45° C. which resulted in the evaporation of the dichloromethane (B.p.40° C.). The resulting warm slurry was then filtered, utilizing a fritted glass filter, to recover the solid product which was azidodeoxycellulose nitrate. The latter product was then purified by briefly boiling with three portions of water, and then dried to constant weight. A light yellow friable solid, weighing 4.0 g, was recovered, and this represented 90 percent of theory.

The product, i.e. azidodeoxycellulose nitrate, decomposed with gas evolution at 200° C. It also flashed upon rapid heating on a spatula. The IR spectrum showed the presence of azide and nitrate groups. Analysis: calculated C,26; H,2.5; N,25.3—found, C,26.2; H, 2.6; N,21.3.

EXAMPLE 3

The procedure of Example 2 was repeated using 10.0 g of azidodeoxycellulose, 400 ml of nitric acid (99%), 300 ml of dichloromethane, and 1200 ml of water. The product yield of azidodeoxycellulose nitrate was 13.0 g which is 88 percent of theory. The product of this example had the same spectrum, elemental analysis, and behavior on heating as the product of Example 2.

EXAMPLE 4

13.0 g of cellulose tosylate was heated with stirring for 72 hrs. at 90° C. with 18.0 g. of sodium azide and 200 ml of dimethylformamide. The solution was cooled, and poured into water to precipitate the azidodeoxycellulose product which was filtered and dried. The product yield was 6.8 g which represented 87 percent of theory. The IR curve showed the presence of the azide groups. Analysis: 22.5 percent was theoretically calculated for the monoazide, however, 26.4 percent was found.

EXAMPLE 5

2.5 g of the azidodeoxycellulose product from Example 4 was nitrated in accordance with the procedure of Example 2 using 100 ml of nitric acid (99%) and 75 ml of dichloromethane. The product yield of the azidodeoxycellulose nitrate product was 2.9 g which represented 78 percent of theory. Also, the compound flashed at 195° in a melting point tube. The IR spectrum of the product showed the presence of nitrate and azide groups. Analysis: 25.3 percent was theoretically calculated for the presence of nitrogen while 25.2 percent was experimentally found.

We claim:

1. A method of making azidodeoxycellulose nitrate comprising converting cellulose to a derivative selected from the group consisting of cellulose mesylate and cellulose tosylate, reacting said cellulose derivative with a metallic azide to give the azidodeoxycellulose product, and nitrating said latter product to produce azidodeoxycellulose nitrate.

2. The method of claim 1 wherein, in ratio, about 30. g of said cellulose mesylate is mixed with about 30. g of sodium azide in about 500 ml. of dimethylformamide to form a solution, heating said solution for about 71 hours at about 90° C., thereafter cooling said solution, pouring said cooled solution into water to precipitate azidodeoxycellulose, and filtering said solution to recover said precipitate in a yield of about 94 percent.

3. The method of claim 2 wherein, in ratio, about 3. to 10. g of said azidodeoxycellulose is ground and added at room temperature with stirring to a mixture of 120 to 400 ml. of 99% nitric acid and 90–300 ml. of dichloromethane forming a solution, pouring said latter solution into about 260 to 1200 ml. of water with vigorous stirring to precipitate azidodeoxycellulose nitrate, and filtering to recover said precipiate in a yield of about 90 percent.

4. The method of claim 1 wherein, in ratio, about 13 g. of cellulose tosylate is mixed with about 18 g. of sodium azide and about 200 ml. of dimethylformamide, heating said mixture with stirring for about 72 hours at about 90° C., thereafter cooling said solution and pouring said solution into water to precipitate azidodeoxycellulose, filtering said solution, and drying said precipitate to recover a product yield of about 87 percent.

5. The method of claim 4 wherein, in ratio, about 2.5 g. of azidodeoxycellulose is mixed with about 100 ml. of nitric acid and about 75 ml. of dichloromethane to form a solution, adding said solution to 360 ml. of water to precipitate azidodeoxycellulose nitrate, filtering said solution to recover the precipitate, purifying said precipitate by boiling in water, and drying to constant weight thereby recovering a product yield of about 90 percent.

* * * * *